UNITED STATES PATENT OFFICE.

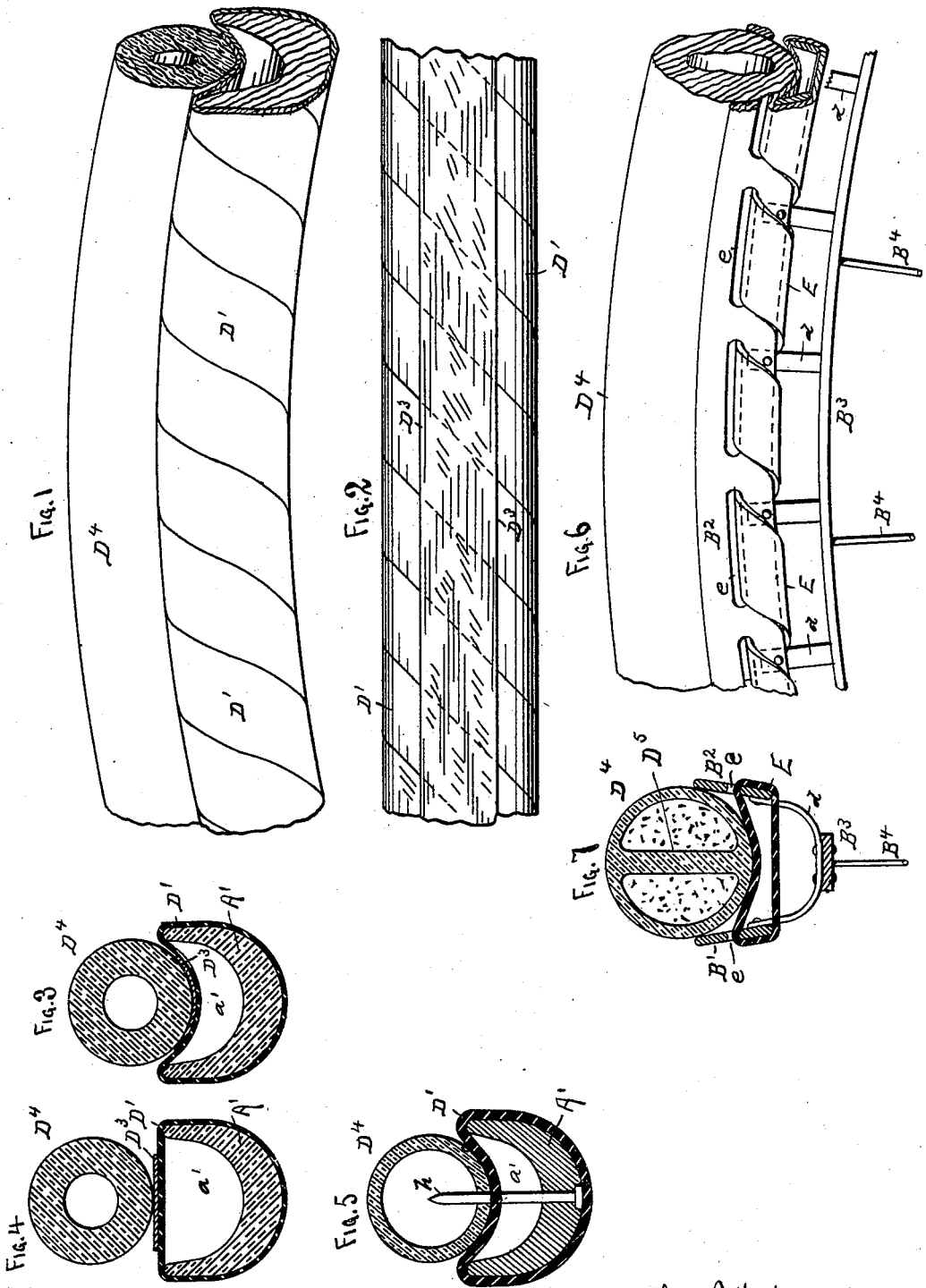

ALBERT J. KECK, OF ST. PAUL, MINNESOTA.

BICYCLE-TIRE.

SPECIFICATION forming part of Letters Patent No. 582,356, dated May 11, 1897.

Application filed June 27, 1896. Serial No. 597,213. (No model.)

*To all whom it may concern:*

Be it known that I, ALBERT J. KECK, a citizen of the United States, residing at the city of St. Paul, in the county of Ramsey and State of Minnesota, have made certain new and useful Improvements in Bicycle-Tires, of which the following is a specification.

This invention relates to bicycle-tires; and it consists in the construction, combination, and arrangement of parts, as hereinafter shown and described, and specifically pointed out in the claims.

In the drawings, Figure 1 is a side view, and Fig. 2 is a plan view, of a section of the rim and tire of a bicycle, illustrating my invention. Fig. 3 is a cross-section of the same. Fig. 4 is a cross-section representing the relative position before the tire is allowed to settle to its place. Fig. 5 is a cross-sectional view similar to Fig. 3, illustrating a modification in the arrangement. Fig. 6 is a side view of a section of the rim and tire; and Fig. 7 is a cross-section of the same, illustrating another modification in the construction.

This invention may be applied to many different forms of wheels, but is more particularly applicable to bicycle-wheels, and for the purpose of illustration I have shown it thus applied.

The rim will be formed either of wood or metal and will have the channel in the rim deeper than usual and with an elastic material stretched around and around the tire and across the channel and with a yielding or flexible tire stretched around the rim outside the elastic material, so that when pressure is brought to bear upon the wheel-axle the elastic material will form a "cushion" to absorb the concussion or jar in the same manner as in the ordinary pneumatic tire. The elastic material will preferably be rubber; but any other material which will accomplish the same results may be employed. The material will be formed into ribbons and wound around the tire, as shown in Figs. 1, 2, 3, 4, and 5.

To illustrate the details of the manner of applying the invention, A' represents the rim when made of wood with the channel $a'$ of greater depth than ordinary, and when formed of metal, as in Figs. 6 and 7, the rim may be formed in two parts $B'$ $B^2$, united at intervals by stays $d$, connecting the two parts of the rim to an inner rim $B^3$, from which the spokes $B^4$ lead.

$D'$ represents the ribbon of elastic material wound around the rim and stretched across the channel. The ribbons of elastic material will generally be long enough, so that one single strip will encompass and inclose the whole rim to cause the strains to be distributed over a greater area than would be the case if the elastic material were in smaller pieces or loops. This is an important feature of my invention and adds greatly to the utility and "life" of the material.

When the metal rim is employed, two sides $B'$ $B^2$ will be formed with perforations $e$ at intervals, and through these perforations and around the lower part of the sides $B'$ $B^2$ the rubber ribbons E are wound, as shown.

Outside the elastic material $D'$ or $D^2$, stretched across the channel, an elastic band $D^3$ may be placed, encircling the rim, and outside of this band a flexible tire $D^4$ is placed, the tire being preferably of rubber and enough smaller than the diameter of the band $D^3$ and the rim to compress the elastic material somewhat, as shown in Figs. 1, 2, 3, 5, 6, and 7, so as to insure the retention of the tire in place. Then when in use and the weight of the rider comes upon the wheel the elastic material will yield and produce the same effect as in the pneumatic tire.

If preferred, a series of pins $h$ may be fixed in the rim and arranged to project into the tire $D^4$ and resist any tendency to lateral movement.

The tire $D^4$ may be formed with a central partition $D^5$, as in Fig. 7, and the hollow spaces filled with felt, bran, or other light substance, if desired.

Having thus described my invention, what I claim as new is—

1. In a bicycle-wheel, a rim having a channel encircling its periphery, a ribbon of elastic material wound around and around the rim and stretched across said channel, and an endless flexible tire stretched around said rim and in contact with said elastic ribbon where stretched across said channel, substantially as and for the purpose set forth.

2. In a bicycle-wheel, a rim having a channel encircling its periphery, a ribbon of elastic material wound around and around the rim and stretched across the channel, an endless elastic band stretched around said rim outside of said ribbon where it crosses said channel, and an endless flexible tire stretched around said rim outside of said elastic band, substantially as and for the purpose set forth.

3. In a bicycle-tire, a rim formed with a channel in its periphery and with perforations in the sides of the rim and leading into said channel, and strips of elastic material wound around said rim and through said perforations, substantially as shown and described.

4. In a bicycle-wheel, the rim having a channel in its periphery, elastic material stretched across said rim outside said channel, a flexible tire supported by said elastic material, and supporting-pins fixed in said rim and projecting into said tire, substantially as shown and described.

5. In a bicycle-wheel, the rim having a channel in its periphery, elastic material stretched across said rim outside said channel, a flexible tire supported by said elastic material, said tire being hollow and with a central supporting-wall and a yielding substance in the interior thereof, substantially as shown and described.

In testimony whereof I have hereunto set my hand in the presence of two subscribing witnesses.

ALBERT J. KECK.

In presence of—
C. N. WOODWARD,
A. LINDAHL.